(12) United States Patent
Sacra

(10) Patent No.: US 7,870,839 B2
(45) Date of Patent: Jan. 18, 2011

(54) DUAL LAYERED PET TOY

(76) Inventor: Stephen M. Sacra, 10975 E. Mark La., Scottsdale, AZ (US) 85262

( * ) Notice: Subject to any disclaimer, the term of this patent is extended or adjusted under 35 U.S.C. 154(b) by 285 days.

(21) Appl. No.: 11/901,519

(22) Filed: Sep. 17, 2007

(65) Prior Publication Data

US 2009/0071411 A1   Mar. 19, 2009

(51) Int. Cl.
*A01K 29/00* (2006.01)
(52) U.S. Cl. ..................................... 119/709
(58) Field of Classification Search ............ 119/709, 119/707, 710, 711; 446/369
See application file for complete search history.

(56) References Cited

U.S. PATENT DOCUMENTS

| | | | | |
|---|---|---|---|---|
| 2,855,881 A | * | 10/1958 | Ottinger et al. | 383/79 |
| 3,445,917 A | | 5/1969 | Adler | |
| 4,170,086 A | * | 10/1979 | Hills | 446/372 |
| 4,904,523 A | * | 2/1990 | Kampf et al. | 442/392 |
| 5,237,961 A | * | 8/1993 | Sarullo | 119/709 |
| 5,421,045 A | * | 6/1995 | Bowen | 5/485 |
| 5,682,838 A | * | 11/1997 | Reich | 119/711 |
| 6,089,947 A | * | 7/2000 | Green | 446/268 |
| 6,240,879 B1 | * | 6/2001 | Denesuk et al. | 119/709 |
| 6,434,769 B1 | * | 8/2002 | Koenig | 5/636 |
| 6,490,998 B1 | | 12/2002 | Rocher | |
| 6,623,328 B1 | * | 9/2003 | Theel | 446/369 |
| 6,918,355 B1 | * | 7/2005 | Arvanites | 119/707 |
| 2003/0213440 A1 | | 11/2003 | Kelly | |
| 2007/0099539 A1 | * | 5/2007 | Fullmer | 446/369 |

FOREIGN PATENT DOCUMENTS

| | | | | |
|---|---|---|---|---|
| DE | 2140917 A | * | 3/1973 | |
| GB | 1057587 A | * | 2/1967 | |

* cited by examiner

*Primary Examiner*—Rob Swiatek
*Assistant Examiner*—Ebony Evans
(74) *Attorney, Agent, or Firm*—Cahill Glazer PLC

(57) ABSTRACT

A flexible, durable pet toy includes an outer plush layer and an inner fleece layer positioned adjacent thereto and optionally adhesively secured thereto. The outer and inner layers form a shell of a three dimensional object, and a filling material fills the shell. Seams that join edges of the outer and inner layers are folded inward and are contained within the object. The seams are reinforced with a webbing strip, and fastened by thread to create a flexible interior skeleton frame. A method for making such a pet toy is also disclosed.

26 Claims, 2 Drawing Sheets

DUAL LAYERED PET TOY

BACKGROUND OF THE INVENTION

1. Field of the Invention

This invention relates to the field of items for amusement, particularly amusement for a domesticated animal, and more particularly to a toy adapted for use by dogs or other pets, that is durable, flexible and appealing.

2. Description of the Related Art

Stuffed plush toys are well known in the art. Such stuffed toys are typically formed by first forming a cloth body of suitable shape and inserting stuffing therein. The shape and contour of the finished stuffed plush toy are largely determined by the fabric configuration, i.e. by cutting the fabric and joining cut edges along seams. Such stuffed toys have various types of conventional stuffing. Furthermore, the fabrics generally used when making such toys are substantially one-layered.

U.S. Pat. No. 3,445,917 to Adler contemplates the use of a stretchable layer of fabric on the exterior of the toy. However, Adler fails to provide any reinforcement to such fabric that will prevent tearage due to strenuous use of the toy by domesticated animals.

Pet toys can be made from many materials or layers of materials. Early attempts to create a durable toy resulted in a hard toy. Many toys designed for pets are carried in the jaws of the animal, tossed, chewed and trampled. Such use causes wear and tear on the product and shortens the life of the toy. Most wear results in torn material or separations at the seams. Certain manufacturers have attempted to strengthen the material or enhance the seams to make a more durable toy. A common problem is that a durable toy tends to have a "hard feel," and loses its appeal to an animal. Most animals prefer soft manageable toys that have some "give," and that can be easily manipulated and provide exercise for the jaw.

Many compressible toys include a single layer of material surrounding a polyester fill with seams. If the material used does not stretch, then the risk of tearage in a domestic animal's mouth increases. Those toys that use a stretchable woven material often lack reinforcement that prevents tearage, leading to a short, limited lifespan of the toy.

To solve the problem of short-lived amusement articles, certain toy manufacturers include a reinforcement layer that strengthens the toy surface. However, such reinforcement changes the nature of the product from a plush layer compressible toy into a harder type of toy. In addition, a reinforcement layer may cause a second type of wear, as the outer plush layer interacts with the reinforcement layer, and the friction created between the two layers further wears on the outer plush layer.

Thus, the goals of providing both a durable object and a stimulating toy often conflict with each other. For instance, U.S. Pat. No. 6,918,355 describes a multi-layered pet toy that includes a bullet resistant layer of nylon to reinforce the durability of a toy. While the toy disclosed in the '355 patent is somewhat deformable, the use of bullet resistant material restricts manufacturing choice, raises the cost of manufacture, and stiffens the feel and character of the plush toy.

Accordingly, it is an object of the present invention to provide a strong, durable, and attractive pet toy that a dog can sink its teeth into without tearing the outer surface of the toy.

It is another object of the present invention to provide a toy that is deformable yet durable.

It is still another object of the present invention to provide a pet toy having a soft external surface that may include various weave types and weights.

It is yet another object of the present invention to provide a pet toy that is easily compressed in the mouth of a dog or other domesticated animal.

It is a further object of the present invention to provide a pet toy with a soft and stretchy feel.

It is a still further object of the present invention to provide such a pet toy that can be manufactured relatively easily and inexpensively.

Still another object of the present invention is to provide a method for advantageously forming such a toy.

These and other objects of the present invention will become more apparent to those skilled in the art as the present description proceeds.

SUMMARY OF THE INVENTION

Briefly described, and in accordance with preferred embodiments thereof, the present invention is a toy for a domesticated animal, e.g., a pet dog. The toy includes a first outer layer made from a plush layer, imitation animal fur, and which is preferably of fleece fabric. This outer plush layer includes an inner surface and an outer surface; the outer surface preferably presents a brushed-looped fleece layer. A second inner layer is provided beneath the first outer layer; this second inner layer is made from a fleece of weight equal to or greater than 200 grams per meter squared, and includes both an inner surface and an outer surface. Preferably, the second inner layer is made of fleece weighing between 200-500 grams per meter squared, and in the preferred embodiment of the invention, the second inner layer is made of fleece material weighing 370-390 grams per meter squared.

The inner surface of the first outer layer is disposed proximate to the outer surface of the second inner layer. If desired, the inner surface of the first outer layer may be glued, cemented, or otherwise adhered to the outer surface of the second inner layer, as by applying an adhesive, such as rubber cement, between such layers. The second inner layer is preferably stronger than the first outer layer to reinforce the first outer layer; the second inner layer helps to prevent tearage while maintaining a soft "feel" of the toy. The inner surface of the second inner layer forms an interior surface of a hollow shell to contain stuffing.

The first outer layer and second inner layer are preferably formed into a three-dimensional shape or object, for example, the shape of an animal, with the first outer layer forming the external circumference of the toy. The first outer layer and second inner layer are cut into a desired pattern, and the edges of such pattern are inwardly folded and stitched together along a seam; the seam forms a joint that preferably extends completely within the interior of the toy.

In the preferred embodiment, each seam is stitched together with thread. Preferably, each seam is further reinforced by a webbing strip made of, for example, nylon or polypropylene. This webbing strip preferably has a denier rating of 400 or greater. The webbing strip is preferably folded over the seam and stitched thereto with thread, e.g., by forming two parallel rows of linear stitches. The combination of the seam and reinforcing webbing strip creates a semi-rigid, yet flexible, internal frame or skeleton to help support the toy. Stuffing, such as polyester fill, polystyrene, polypropylene, polymer, or any combination thereof, fills the interior of the toy to give it body and shape, and to produce a soft, squeezable/deformable, and appealing dog toy.

The resulting toy retains the appeal of a plush outer layer with a soft feel, while including a reinforcing durable inner layer that is both resilient and malleable.

Another aspect of the present invention relates to a method for forming such a toy. In practicing such method, an outer layer is provided with a plush surface, preferably of fleece fabric. An inner layer of a fleece material is also provided, the inner layer having a weight greater than or equal to 200 grams per square meter. The inner layer is disposed adjacent to the outer layer. The outer and inner layers are configured to form a hollow shell, and the hollow shell is filled with pliable fill material. Preferably, the novel method includes the formation of one or more interior seams, and securing a webbing strip over such interior seams. The interior seams and attached webbing form a supporting skeleton within the toy.

In securing the interior seams, adjoining edges of the outer and inner layers are preferably folded inwardly and secured by thread sewn through such layers. Preferably, such thread is sewn in a standard straight line stitch; dual rows of such stitching are preferred. In securing the webbing strip over such seams, thread is preferably sewn in a standard straight line stitch through the webbing and through the folded outer and inner layers, and dual rows of such stitching are preferred.

While the mechanism for securing the outer and inner layers to each other may simply be the seams described above, it may be desired to adhere the interior surface of the outer plush layer to the outer surface of the inner layer of fleece before producing such seams. In this case, the preferred adhesive is rubber cement.

DESCRIPTION OF THE PREFERRED EMBODIMENT

Figure 1:
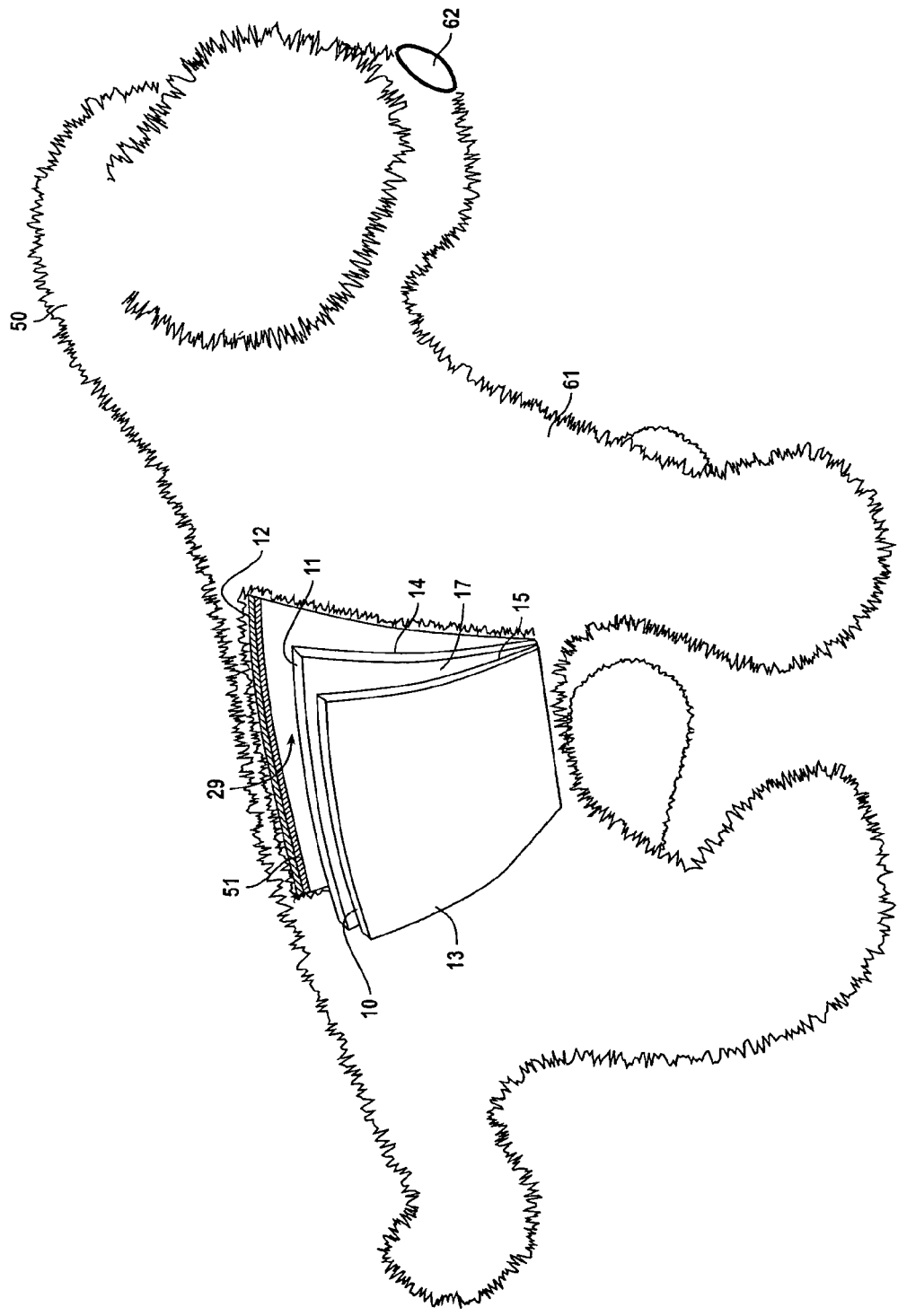
FIG. 1 depicts a perspective, partially cut-away, view of a pet toy in the general shape of a dog.

A pet toy constructed in accordance with a preferred embodiment of the present invention is shown in FIG. 1 and is designated generally by reference numeral 50. Pet toy 50 includes at least first and second layers of material which collectively form an outer body 12 surrounding a stuffed interior 51. The first outer layer 10 is a layer of plush fabric, and is preferably a sherpa fleece material that can be raised, brushed or looped so as to appeal to a dog, cat or other domesticated animal. The second inner layer 11 is disposed adjacent to first outer layer 10 and preferably forms tightly next to first layer 10. Second inner layer 11 is made of a flexible fleece material; second layer 11 is stronger and more durable than outer layer 10. In combination, these two layers 10 and 11 form outer body 12 in a manner that provides improved structural strength without greatly diminishing the flexibility, contouring, and appeal of the toy. FIG. 1 shows layers 10 and 11 partially cut, and pulled out, to illustrate how layers 10 and 11 essentially lay flat against each other, and to illustrate the interior 51 of cavity 29 that fills the volume surrounded by outer body 12. The first layer 10 extends around the entire volume of the three dimensional body 50 forming the outermost surfaces. Second layer 11 lies directly within, and adjacent to, first layer 10.

The two layers 10 and 11 that form outer body 12 should remain relatively adjacent to each other during the useful life of the toy. One preferred method to maintain this positioning includes the use of an adhesive 30 (see FIGS. 2 and 4) applied between outer layer 10 and inner layer 11 to firmly secure the inner surface of outer layer 10 against the outer surface of inner layer 11. The preferred adhesive is a so-called "rubber cement" having a latex base, which is non-toxic, and somewhat stretchable. Rubber cement is flexible once set, and will not inhibit flexing of the toy. Alternatively, outer layer 10 and inner layer 11 may be woven together to form a single unified fabric, as opposed to the illustrated embodiment containing two separate layers each of whole cloth. Other contemplated embodiments omit adhesive layer 30, and rely instead upon internal seams 20 (see FIGS. 2 and 3) to maintain first layer 10 and second layer 12 adjacent to each other.

As mentioned above, first outer layer 10 is preferably formed by a sherpa fleece cloth. This outer layer should be of a lightweight material, preferably about 230 grams per square meter in weight; if desired, outer layer 10 can be as high as 380 grams per square meter or greater. Outer layer 10 includes an outer-facing first side 13. Outer surface 13 of first layer 10 is preferably fluffy in texture and appearance, as presenting a pulled surface. However, some, or even all, of outer surface 13 may be provided as a brushed surface, or brushed loop surface, that is relatively smooth. Ornamental designs may be formed upon outer body 12 of toy 50 by varying the "fluffiness" or "smoothness" of the outer surface 13 of first outer layer 10; for instance, as shown in FIG. 1, toy 50 may have an outer body 12 that includes both a fluffy main "body" portion 61 and a relatively smooth "face" or "nose" portion 62. Internal seams (explained below) can be used to join "fluffy" portions of body 12 to contrasting smooth portions of body 12. The opposing inwardly-facing surface 15 of outer layer 10 should be made relatively smooth; this inwardly-facing surface 15 of outer layer 10 is preferably forms a square grid, similar to the underside of many flooring carpets.

Still referring to FIG. 1, second inner layer 11 is preferably made of a fleece of a higher weight, e.g., in the range between 200 to 550 grams per square meter. In the preferred embodiment, second inner fleece layer 11 has a weight of 380 grams per square meter. Second inner layer 11 includes an inner-facing surface 14 and an opposing outer-facing surface 17. It is preferred that both inner-facing surface 14 and outer-facing surface 17 of second inner layer 11 should be kept relatively smooth. Outer facing surface 17 preferably compliments inner surface 15 of first outer layer 10, thereby allowing the two layers to fit closely against each other. The addition of the stronger inner layer 11 of fleece under the outer layer 10 reinforces the outer layer 10 and increases the amount of tension required to stretch the fabric. Thus, outer body 12 of toy 50 is better protected from breaking and tearing.

In an alternative embodiment of the present invention, outer layer 10 and inner layer 11 are both made from a fleece material of the same weight. For example, the use of 380 grams per square meter fleece material to form both the outer and inner layers 10 and 11 is believed to produce a suitable toy.

In the preferred embodiment, all fleece material is of a woven fabric wherein weft-knitted strands run crosswise through the cloth, while perpendicular strands of yarn run warp over, and under, the weft strands. Alternatively, the weft-knitted fabric may use a ground yarn of low-twists, laid-in and secured by a binder also made of yarn on the back of the fabric. As the fleece material wears from repeated use, outer body 12 of toy 50 increases its flexibility, allowing for repeated tensions and stresses applied by a domestic animal's jaw, teeth, claw as well as dragging, pulling, burying, etc. The structure of the fabrics used to form outer layer 10 and inner layer 11 should be pliable and malleable to allow for manipulation and tension displacement without tearing the fabric.

Figure 2:
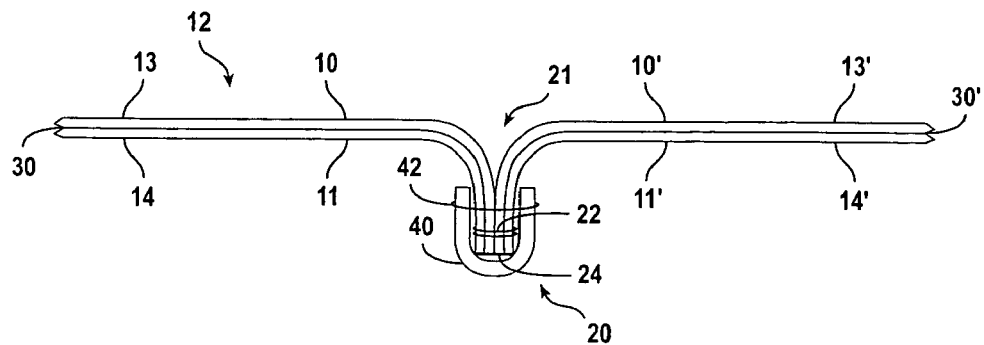
FIG. 2 depicts a cross-sectional view of a portion of the toy shown in FIG. 1, and illustrating a frame webbing strip applied via stitching over a seam with a single thread.
Figure 3:
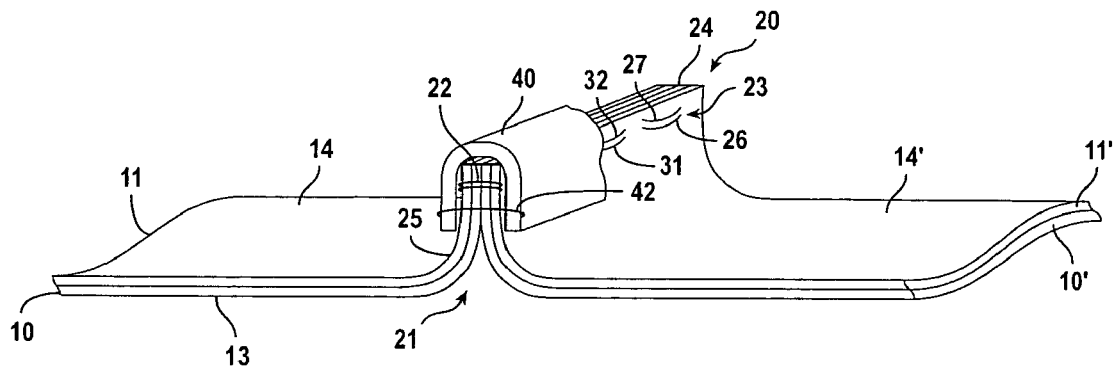
FIG. 3 depicts a perspective view of an interior seam with the webbing strip partially cut-away.

Referring to FIGS. 2 and 3, an inner seam 20 is shown formed along a joint 21. Such seams and joints are helpful, if not necessary, to form the fabric layers into a patterned three dimensional object. An edge portion of outer layer 10 of one fabric panel abuts an adjoining edge portion of outer layer 10' of a second fabric panel at the joint 21. The second inner layer 11 and coincident second inner layer 11' do not contact each other, but are shielded by the corresponding first outer layers 10 and 10'. The adjoining edge portions of the fabric layers (10/11 and 10'/11') to be joined at seam 20 are folded inwardly toward the center of toy 50 to maintain a relatively continuous outer surface along outer body 12 of three dimensional toy 50. The overlapped edges 24 of the fabric layers are initially exposed inside the object. A webbing strip 40 is preferably applied over edges 24 to further reinforce joint 21.

Still referring to FIGS. 2 and 3, in the preferred embodiment, stitching is applied, via thread 22, along inner seam 20 to engage inner and outer layers 10 and 11, including any adhesive layer 30 therebetween, and to also engage inner and outer layers 10' and 11' of the adjoining body panel. Thread 22, used for such stitching, is preferably a polyester thread with a 20# size. Alternatively, a nylon thread may be used. The edges 24 of the first layers 10 and 10' and second layers 11 and 11' are bound with the connection of thread 22 passing through layers in order: second layer 11', first layer 10', first layer 10, second layer 10. Alternatively, where an adhesive is used to secure the outer layer (10 or 10') to its respective inner layer (11 or 11'), then the order of thread penetration becomes: second layer 11', adhesive layer 30', first layer 10', first layer 10, adhesive layer 30, second layer 11.

As shown best in FIG. 3, two spaced, parallel stitched rows are formed, including a first row containing stitches 31 and 26, and a second row containing stitches 32 and 27. The first row of stitches (31/26) formed by thread 22 is stitched along the length of the seam, preferably at a constant spacing from the edge 24 of the fabric layers. The stitching pattern 23 should be of a standard common linear mode to create a flat seam. The stitching preferably runs along the length of seam 20, and a few extra stitches may be applied at each end 25 of the seam to prevent unraveling. The above-described stitching pattern 23 is used to form the first row of stitches 31/26 and is then repeated to form a second row of stitches 32/27, running parallel to, and spaced slightly apart from the first row 31/26, to complete a double straight line stitch pattern. While thread is used to form stitching in the preferred embodiment, other material adhesion techniques (e.g., glues, cements, etc.) may also be used to secure the overlapped edges of the fabric layers together.

Webbing strip 40 is applied over stitched rows 26 and 27 of seam 20 from the inside of the toy, thereby reinforcing joint 21 and seam 20. Webbing strip 40 is preferably composed of an elongated strip of polypropylene material approximately ⅞" wide and weighing approximately seven to eight grams per square yard. Alternatively, webbing strip 40 may instead be made of a nylon material, preferably of a denier rating greater than 400. Webbing strip 40 is folded lengthwise over seam 20 to surround rough edges 24 of the fleece layers (10/11 and 10'/11'). Webbing strip 40 is then stitched on top of, and around, seam 20 in the method described above, preferably using two parallel, spaced rows of stitches. A thread 42 may be used to secure the webbing strip 40 over seam 20, and is threaded through the original seam 20 to reinforce the seam and prevent separation. Again, while thread is used to form stitching to secure webbing strip 40 in the preferred embodiment, other material adhesion techniques (e.g., glues, cements, etc.) may also be used to secure webbing strip 40 around the overlapped edges of the fabric layers.

During construction, outer body 12 is turned inside-out, allowing access to the majority of the seams and joints. After completing all but the final joint, outer body 12 is turned right-side out. Outer body 12 can then be filled with stuffing material, and the final joint can then be sealed. When completed, the three dimensional object 50 preferably forms the shape of an animal, such as a dog, cat, or chicken; however, the shape can be of any formed three dimensional object. FIG. 1 illustrates the three dimensional toy formed into the rough shape of a dog. The seams are all turned inside the object, with all stitching hidden inside of the object. The reinforced seams are strong, yet not so rigid as to prevent flexing of the toy. As used herein, the term "rigidity" corresponds to the relative amount of pressure required to deform the seam as applied directly perpendicular to its length. Low rigidity includes deformation occurring upon application of less than one-pound of pressure. Moderate rigidity corresponds to deformation requiring application of a force greater than one-pound of pressure, yet less than three pounds of pressure. High rigidity corresponds to deformation requiring the application of greater than three pounds pressure to the joint. In any event, the internal frame, or skeleton, formed by such internal seams and joints is not so rigid as to create rigid corners or edges on the toy that might otherwise decrease the appeal of the toy to a pet or other domesticated animal.

Figure 4:
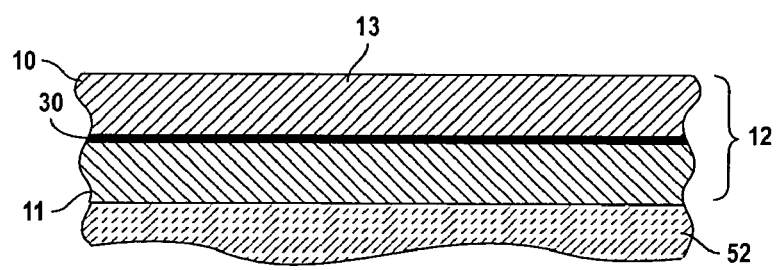
FIG. 4 depicts a cross sectional view of a portion of the toy including a brushed fleece outer layer, the inner reinforcement layer, and the enclosed filling.

Referring briefly to FIG. 4, outer body 12 is shown to include first outer layer 10 and second inner layer 11, optionally secured to each other by adhesive 30. Cavity 29 of toy 50 is stuffed with filling 52 to give shape to the toy, while yielding to compression forces and other forces applied to the outside of the toy. The filling 52 may be comprised of polyester fibers, polypropylene, polystyrene, a combination of such fibers, or any other similar filling material. In the preferred embodiment, stuffing 52 is 100% polyester, non-allergenic, siliconized fibers arranged in a random pattern to improve resilience. Such filling material is commercially available, for example, from Fairfield Processing Corporation of Danbury, Conn., under the brand names "POLY-FIL", "SOFT-TOUCH", and/or "NATURE-FIL".

Those skilled in the art will now appreciate that a pet toy has been described that provides the advantages of being strong and durable, yet remaining malleable and attractive to a pet. The toy disclosed herein has a soft and stretchy feel, and can be easily compressed in the mouth of a dog or other domesticated animal, yet has a low risk of tearing. Furthermore, the inventive toy disclosed herein can be manufactured relatively easily and inexpensively. It will also be appreciated that the present invention provides an improved method for forming such a pet toy. While the present invention has been described with respect to preferred embodiments thereof, such description is for illustrative purposes only, and is not to be construed as limiting the scope of the invention. Various modifications and changes may be made to the described embodiments by those skilled in the art without departing from the true spirit and scope of the invention as defined by the appended claims.

I claim:
1. A toy for a domestic animal comprising:
a first outer layer, comprising an inner surface and an outer surface, made from a plush layer of fabric;

a second inner layer, comprising an inner surface and an outer surface, made from a fleece of weight equal to or greater than 200 grams per meter squared;

said first layer and said second layer formed into a three-dimensional object with said first layer forming the external circumference and said second layer surrounding a hollow shell;

said first layer inner surface set proximate to said second layer outer surface; and a pliable filling material disposed within said hollow shell and surrounded by said second layer.

2. The toy for a domestic animal of claim 1 wherein said first outer layer is made of a fleece fabric.

3. The toy for a domestic animal of claim 2 further comprising an adhesive disposed between said first layer and said second layer and attaching said first layer to said second layer.

4. The toy for a domestic animal of claim 3 wherein said adhesive is a rubber cement.

5. The toy for a domestic animal of claim 1, wherein said pliable filling material is selected from the group consisting of: polyester or polystyrene or polypropylene or polymer or any combination thereof.

6. A toy for a domestic animal comprising:

a first outer layer, comprising an inner surface and an outer surface, made from a plush layer of fleece fabric;

a second inner layer, comprising an inner surface and an outer surface, made from a fleece of weight equal to or greater than 200 grams per meter squared;

said first layer and said second layer formed into a three-dimensional object with said first layer forming the external circumference, and a joint formed on the interior of the three-dimensional object; and said first layer inner surface set proximate to said second layer outer surface.

7. The toy for a domestic animal of claim 6 wherein said joint contains a seam that is held by a webbing strip comprised by material selected from the group consisting of polypropylene, or nylon with denier equal to or greater than 400.

8. The toy for a domestic animal of claim 7 wherein said webbing strip is sewn over said seam with a thread.

9. The toy for a domestic animal of claim 8 wherein said thread is formed in a first and a second line stitch.

10. A toy for a domestic animal comprising:

a first outer layer made of fleece having an inner surface and an outer surface;

a second inner layer made of fleece having an inner surface and an outer surface;

said outer surface on said second inner layer disposed proximate to said inner surface of said first outer layer;

said first layer and said second layer formed into a three dimensional shape with said first layer outer surface forming the exterior surface of the three dimensional shape, and said second layer inner surface forming an interior surface of a shell;

a seam formed at a joint of the exterior surface of the three dimensional shape, said seam being directed within the three dimensional shape;

a first thread extending through edges of said first outer layer and said second inner layer;

a webbing strip disposed over the edges of said first outer layer and said second inner layer;

and a second thread extending through said webbing strip and through said edges of said first outer layer and said second inner layer for securing said webbing strip over said seam;

wherein said seam, webbing strip, and threads forming an interior skeleton.

11. The toy for a domestic animal of claim 10 wherein said second layer outer surface is adhered to the said first layer inner surface by an adhesive.

12. The toy for a domestic animal of claim 11 wherein said adhesive is rubber cement.

13. The toy for a domestic animal of claim 10 further comprising a filling material.

14. The toy for a domestic animal of claim 10 wherein said first layer is comprised of a plush layer of fabric.

15. The toy for a domestic animal of claim 14 wherein said first layer is comprised of imitation animal fur.

16. The toy for a domestic animal of claim 10 wherein said second layer is comprised of fleece weighing 200-500 grams per meter squared.

17. The toy for a domestic animal of claim 16 wherein said second layer is comprised of fleece weighing 370-390 grams per meter squared.

18. The toy for a domestic animal of claim 10 wherein said webbing strip is comprised of a nylon material equal to or greater than 400 denier.

19. The toy for a domestic animal of claim 10 wherein said webbing strip is comprised of a polypropylene material.

20. The toy for a domestic animal of claim 10 wherein said interior skeleton is of a low to moderate rigidity.

21. A method for forming a toy for a domestic animal as a three dimensional formed object comprising the steps of:

providing an outer layer of plush fabric;

providing an inner layer of a fleece material of weight greater than or equal to 200 grams per square meter;

setting said outer layer adjacent to said inner layer;

configuring said outer layer and said inner layer to form a hollow shell, with said outer layer surrounding said inner layer; and filling said hollow shell with fill material.

22. The method for forming a toy for a domestic animal as in claim 21 further comprising the steps of:

providing an interior seam; and sewing a webbing strip over said interior seam to form an interior skeleton within said three dimensional formed object.

23. The method for forming a toy for a domestic animal as in claim 22 wherein said sewing step includes sewing a thread in standard straight line stitch through both the webbing strip and the interior seam.

24. The method for forming a toy for a domestic animal as in claim 21 further comprising the step of adhering an interior surface of said outer layer to an exterior surface of said inner layer.

25. The method for forming a toy for a domestic animal as in claim 24 further including the step of applying an adhesive to adhere said interior surface of said outer layer to said exterior surface of said inner layer.

26. The method for forming a toy for a domestic animal as in claim 25 wherein said adhesive is rubber cement.

* * * * *